(12) United States Patent
Blanton et al.

(10) Patent No.: US 10,069,635 B2
(45) Date of Patent: Sep. 4, 2018

(54) METHODS AND SYSTEMS FOR ACHIEVING SYSTEM-LEVEL COUNTERFEIT PROTECTION IN INTEGRATED CHIPS

(71) Applicant: CARNEGIE MELLON UNIVERSITY, a Pennsylvania Non-Profit Corporation, Pittsburgh, PA (US)

(72) Inventors: Ronald DeShawn Blanton, Sewickley, PA (US); Benjamin Niewenhuis, Richardson, TX (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 7 days.

(21) Appl. No.: 14/850,900

(22) Filed: Sep. 10, 2015

(65) Prior Publication Data

US 2016/0072632 A1 Mar. 10, 2016

Related U.S. Application Data

(60) Provisional application No. 62/070,988, filed on Sep. 10, 2014.

(51) Int. Cl.
*G06F 11/30* (2006.01)
*H04L 9/32* (2006.01)
*G09C 1/00* (2006.01)

(52) U.S. Cl.
CPC .............. *H04L 9/3278* (2013.01); *G09C 1/00* (2013.01)

(58) Field of Classification Search
CPC .................................. H04L 9/3278; G09C 1/00
USPC ........................................................ 713/189
See application file for complete search history.

(56) References Cited

U.S. PATENT DOCUMENTS

| | | | | |
|---|---|---|---|---|
| 7,376,915 B1* | 5/2008 | Duewer | ......... | G01R 31/318536 716/119 |
| 2004/0064764 A1* | 4/2004 | Gomez | .......... | G01R 31/318533 714/47.1 |
| 2009/0326840 A1* | 12/2009 | Gebara | .................. | G11C 29/50 702/57 |
| 2012/0123724 A1* | 5/2012 | Buechner | ................. | H03K 5/19 702/117 |
| 2014/0108786 A1* | 4/2014 | Kreft | ...................... | G06F 21/71 713/156 |

OTHER PUBLICATIONS

Clarke, B. et al., "Silicon Physical Random Functions," in Proceedings of the 9th ACM Conference on Computer and Communications Security, 2002, pp. 148-160.
Gassend, B. et al., "Controlled Physical Random Functions," in Computer Security Applications, 2002.

(Continued)

*Primary Examiner* — Anthony Brown
(74) *Attorney, Agent, or Firm* — David G. Oberdick; Michael G. Monyok (57) ABSTRACT

According to embodiments of the present invention are systems and methods for using scan chains for the creation of unique physically uncloneable function (PUF). In particular, the present invention uses existing circuitry on an integrated circuit and the internal-scan or boundary-scan register to create a unique identifier for each integrated chip. The unique nature of the scan chains results from the inherent variability of the manufacturing process.

16 Claims, 6 Drawing Sheets

(56) References Cited

OTHER PUBLICATIONS

Gassend, B. et al., "Identification and authentication of integrated circuits," in Concurrency and Computation: Practice & Experience, 2004, pp. 1077-1098.
Lee, J. W. et al., "A technique to build a secret key in integrated circuits with identification and authentication applications," in IEEE VLSI Circuits Symposium, 2004.
Guajardo, J. et al., "FPGA Intrinsic PUFs and Their Use for IP Protection," in Cryptographic Hardware and Embedded Systems, 2007, pp. 63-80.
Suh, G. E. et al., "Physical unclonable functions for device authentication and secret key generation," in Design Automation Conference, 2007, pp. 9-14.
Majzoobi, M. et al., "Lightweight secure PUFs," in International Conference on Computer Aided Design, 2008, pp. 670-673.
Ozturk, E. et al., "Physical unclonable function with tristate buffers," in IEEE International Symposium on Circuits and Systems, 2008, pp. 3194-3197.
Puntin, D. et al., "CMOS unclonable system for secure authentication based on device variability," in 34th European Solid-State Circuits Conference, 2008, pp. 130-133.
Su, Ying et al., "A Digital 1.6 pJ/bit Chip Identification Circuit Using Process Variations," IEEE Journal of Solid-State Circuits, vol. 43, No. 1, pp. 69-77, Jan. 2008.
Helinski, R. et al., "A physical unclonable function defined using power distribution system equivalent resistance variations," in ACM/IEEE Design Automation Conference, 2009, pp. 676-681.
Holcomb, D.E. et al., "Power-Up SRAM State as an Identifying Fingerprint and Source of True Random Numbers," IEEE Transaction on Computers, vol. 58, No. 9, pp. 1198-1210, Sep. 2009.
Srinivasan, S. et al., "A 4Gbps 0.57pJ/bit Process-Voltage-Temperature Variation Tolerant All-Digital True Random Number Generator in 45nm CMOS," in IEEE Conference on VLSI Design, 2009, pp. 301-306.
Bhargava, M. et al., "Attack Resistant Sense Amplifier Based PUFs (SA-PUF) with Deterministic and Controllable Reliability of PUF Responses," in IEEE International Symposium on Hardware-Oriented Security and Trust, 2010.
Maes, R. et al., "Intrinsic PUFs from Flip-flops on Reconfigurable Devices," in Benelux Workshop on Information and System, 2008.
Van Der Leest, V. et al., "Hardware intrinsic security from D flip-flops," in ACM workshop on Scalable trusted computing, 2010, pp. 53-62.
Abramovici, M. et al., Digital Systems Testing & Testable Design. New York, USA: Wiley-IEEE Press, 1994.
Niewenhuis, Ben et al., "SCAN-PUF: A low overhead Physically Unclonable Function from scan chain power-up states." In Test Conference (ITC), 2013 IEEE International, pp. 1-8. IEEE, 2013.

* cited by examiner

| 1 | 0 | 1 | 1 | 0 | 0 | 1 | 0 | 1 | 0 | 1 | 1 | 1 | 0 | 0 | 1 | 1 | 0 | 0 |
|---|---|---|---|---|---|---|---|---|---|---|---|---|---|---|---|---|---|---|
| * | * |   |   | * | * | * | * |   |   |   | * |   |   | * | * |   | * | * |

METHODS AND SYSTEMS FOR ACHIEVING SYSTEM-LEVEL COUNTERFEIT PROTECTION IN INTEGRATED CHIPS

CROSS-REFERENCE TO RELATED APPLICATIONS

This application claims the benefit under 35 U.S.C. § 119 of Provisional Ser. No. 62/070,988, filed Sep. 10, 2014, which is incorporated herein by reference.

STATEMENT REGARDING FEDERALLY SPONSORED RESEARCH

Not applicable.

BACKGROUND OF THE INVENTION

The invention relates generally to physically unclonable functions (PUF). More specifically, the invention relates to a system and method that utilizes a subset of the scan chain power-up states of an integrated circuit (IC) as a type of PUF to authenticate the IC, among other uses.

PUFs are structures with many applications, including device authentication, identification, and cryptographic key generation. In the context of a silicon-based circuit, a PUF is a die-specific random function that is based on an underlying manufacturing variability, such as random dopant fluctuations or line edge roughness. Because the variability is beyond the resolution of modern manufacturing techniques, creating an exact physical copy of a PUF is practically infeasible.

Generally, device authentication involves using the unique properties that every IC exhibits as a result of the imperfections in the fabrication process. Specifically, although every chip is designed to be exactly the same, the inability to fabricate identical chips is exploited to create a unique key for each chip. This key is typically referred to as a physically uncloneable function, or PUF, since it is based on physical properties that are unique to each IC and it cannot be predicted since it depends on the variations of the manufacturing process.

To use this manufacturing variability as part of a PUF, the variability is translated into a random bit. In turn, a string of these random bits is typically combined with a challenge (input) in the PUF to create a returned response (output). Because the string of random bits will be unique to each IC, the response will be unique as well and can be used to identify the IC. In other words, when a stimulus is applied to an individual circuit, it responds in an unpredictable, but unique and repeatable way.

With many ICs being fabricated overseas, it is imperative that techniques be developed to ensure the authenticity of each IC. Not only is it possible to receive an inferior, counterfeit product, it is also possible that malicious circuits have been added to the IC for various nefarious purposes that range from IC destruction to communication eavesdropping. This concern is especially critical for applications involving the nation's security.

There are many types of PUFs used to authenticate ICs. For example, various types of PUFs include ring oscillators, arbiters, SRAM, sense amplifiers, and D-type flip flops. Of the various types of PUFs, some require specialized circuits while others can leverage existing circuitry within the design. The latter approach is typically referred to as an intrinsic PUF. An example of an intrinsic PUF is one that uses the power-on state of an existing SRAM circuit.

Another example of an intrinsic PUF is one that uses an arbiter to exploit the race condition created by two symmetrical circuit paths. Under ideal circumstances, the circuit paths will produce identical delays. However, due to manufacturing imperfections, the delays will be slightly different. The arbiter determines which path is faster and uses the result to create a binary result (logic 0 or 1), which of course will randomly vary from chip to chip. Having multiple copies of the same circuitry setup within the IC allows the creation of a string of binary bits that, due to the randomness, is unique for each chip.

Intrinsic PUFs are obviously more desirable since the cost of implementing the PUF is mitigated by the use of existing circuitry. But all the approaches developed thus far incur some overhead in that they require (i) additional circuitry for accessing the PUF and/or (ii) modifications to the existing circuitry which undoubtedly has performance and power penalties. Therefore a need exists for an approach that does not exhibit any of these shortcomings.

BRIEF SUMMARY OF THE INVENTION

According to embodiments of the present disclosure are systems and methods for using scan chains to create physically uncloneable functions (PUF). In particular, the present invention uses, without any alteration, existing circuitry on the chip and the boundary and internal scan circuitry to create a unique identifier for each integrated chip. The unique identifier is based on the power-up state of the scan elements. While a portion of the scan elements are unreliable and do not consistently power-up to the same state, a selection method is used to determine a subset of stable scan elements, which can be used as a PUF. Because scan is ubiquitous for every IC and typically consists of hundreds of thousands to millions of flip-flops, there is a virtual unlimited supply of bits for directly creating an easily-accessible PUF without any performance or area overhead.

DETAILED DESCRIPTION OF THE INVENTION

Figure 1:
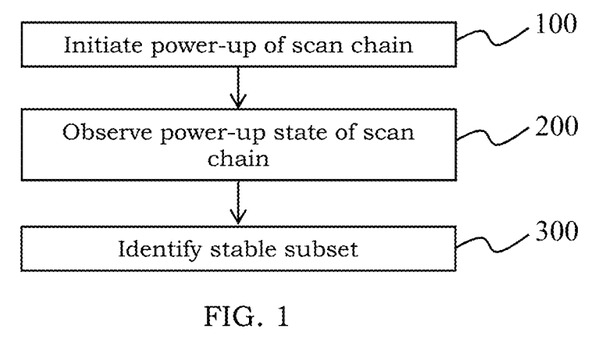
FIG. 1 is a flowchart of the method according to one embodiment of the present invention.

Embodiments of the present invention and its advantages are best understood by referring to the figures. FIG. 1 is a flowchart of the method of creating a PUF from a scan chain according to a preferred embodiment. At step 100, the IC or board is powered-up to initiate the scan chain. Scan is a design-for-testability technique that adds another mode of operation to an IC for improving testability and debugging. In its simplest form, scan design adds a single control input (typically called the scan enable) to reconfigure virtually all the flip-flops into one or more shift registers called scan chains. The input and output of each chain are dynamically routed to the I/O of the chip during testing.

Figure 2:
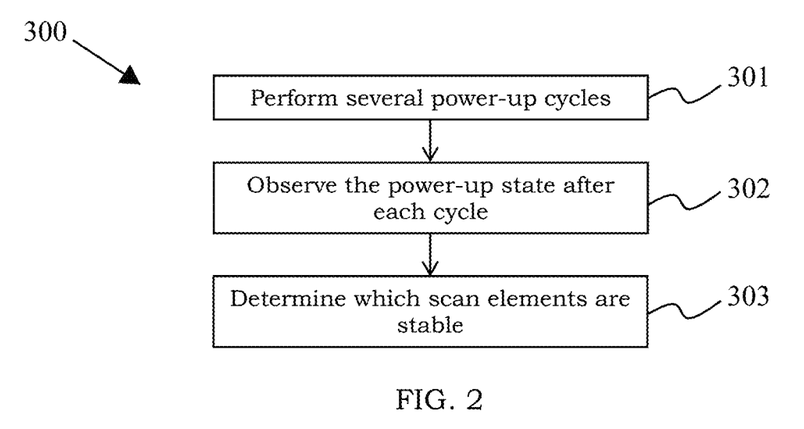
FIG. 2 is a flowchart depicting a subroutine of the method according to an alternative embodiment.

After the scan is enabled, at step 200 the power-up state of the scan chain is observed. From this observation or multiple observations, a subset of the scan chain is identified at step 300. The subset comprises a grouping of stable scan elements that consistently power-up to the same state. The identification method is generally shown in FIG. 2, and comprises performing several power-up cycles (step 301), observing the power-up state after each cycle (step 302), and determining which scan elements are stable (step 303).

Figure 3:
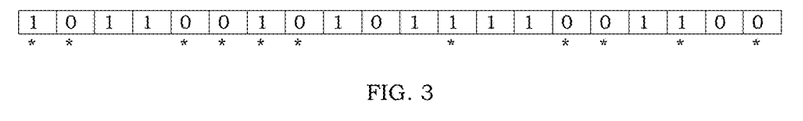
FIG. 3 as an example of a power-on state of a 20-bit scan chain, with the stable subset denoted by asterisks.
Figure 4:
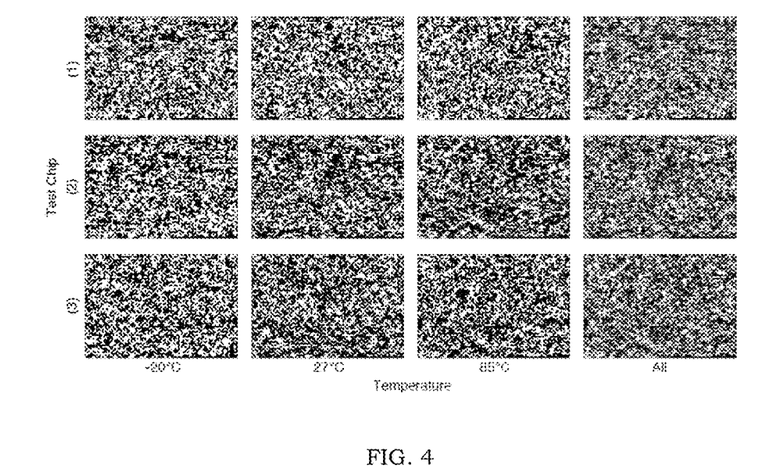
FIG. 4 shows a series of mappings of scan chain power-up states for three different chips at different temperatures.

FIG. 3 shows a 20-bit string scan chain as an example of the power-up state observed at step 200. The subset of the scan chain identified at step 300 is marked with asterisks. Only the marked scan elements, or subset, would be used in the PUF. By way of further example, FIG. 4 is a mapping of scan chain data observed at step 200. In this particular example, chips having a scan chain comprised of 6,057 D-type flip-flops were observed. Each row represents one of the three chips. The first three columns represent power-up initiation at different temperatures: −20° C., 27° C., and 85° C., respectively. The final column shows an aggregation of the first three columns. As shown in the mapping, each of the 6,057 scan elements is shown in a first state (black) or a second state (white) in the mapping comprising 61×100 pixels. The mappings shown in FIG. 4 indicate the uniqueness of the scan chains, since no pattern is readily detectable among the different chips.

If a manufacturer is using this method as a way to provide authentication to a customer at a later date, the stable subset can be determined during the manufacturing tests. It can be expected that the additional costs to the manufacturer would be less than 1% of the typically testing costs. In this example, the manufacturer would keep a database where each chip is referenced to the stable subset for that particular chip. When a customer wants to authenticate a chip, it will send a scan chain readout to the manufacturer, such as via the internet or some other means. Using FIG. 3 as an example, the customer would send the entire 20-bit string to the manufacturer along with the chip serial number. Using its database, the manufacturer would determine that a chip with that serial number should have a stable subset that is 11 bits long and comprised of bits 1, 2, 5, 6, 7, 8, 12, 15, 16, 18, and 20. Also, the manufacturer would know the states for each of these bits.

By comparing the readout provided by the customer to its database, the manufacturer could confirm the chip as authentic. It is not necessary to reveal to the customer which scan locations have been chosen to make up the PUF. At the board and system level, the customer would access the power-on state specified by each board or system manufacturer for all chips. This state along with the part number would again be provided to the manufacturer for verification.

After observing the power-up state, several methods can be used to determine what constitutes a stable scan element, depending on the level of consistency and accuracy required for a given use. For example, chip identification may only require a >90% accuracy rate, whereas a cryptographic use may require near 100% accuracy. Methods of finding a stable scan element can include selecting scan elements that revert to a particular state after a majority of power-up cycles (majority selection method) or only selecting the scan elements that always revert to a particular state (unanimous selection method).

In the unanimous selection method, the power-up cycle is repeated several times and elements that exhibit a different state from a previous cycle are removed from consideration for the stable subset. In other words, only elements that consistently evaluate to the same state after a certain number of observations can be considered stable elements. As the number of observations is increased, accuracy increases. For example, the probability that a flip-flop will be observed in a first state is much higher if that flip-flop was observed in that state consistently for 500 power-up cycles as opposed to only 5 power-up cycles.

Figure 8:
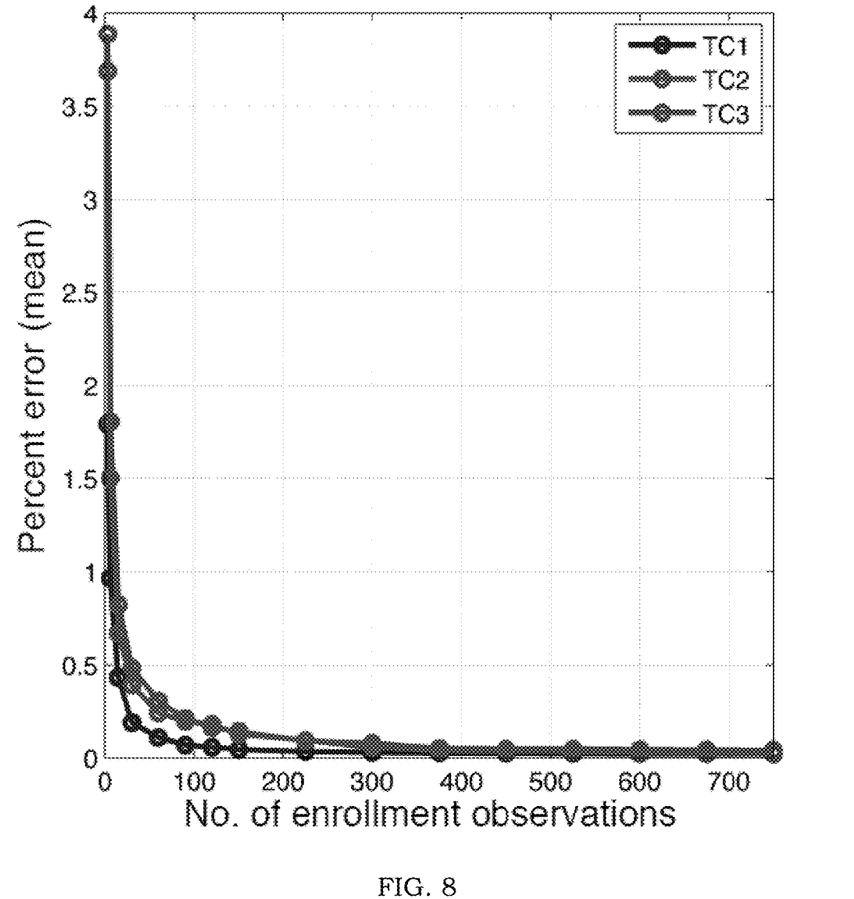
FIG. 8 is a graph showing the average error rate for a single observation using a unanimous selection scheme, according to one embodiment.

This concept is shown in FIG. 8, which shows the average error rate as a function of the number of enrollment observations for three separate chips. The error rate is defined as the percentage of elements in the scan chain that did not match the expected state in a given observation. As shown in FIG. 8, the error rate for all three chips falls below 0.1% after 300 enrollment observations. A user, such as a manufacturer authenticating chips, will be able to determine the number of observations based on an acceptable error rate for their use.

Figure 9:
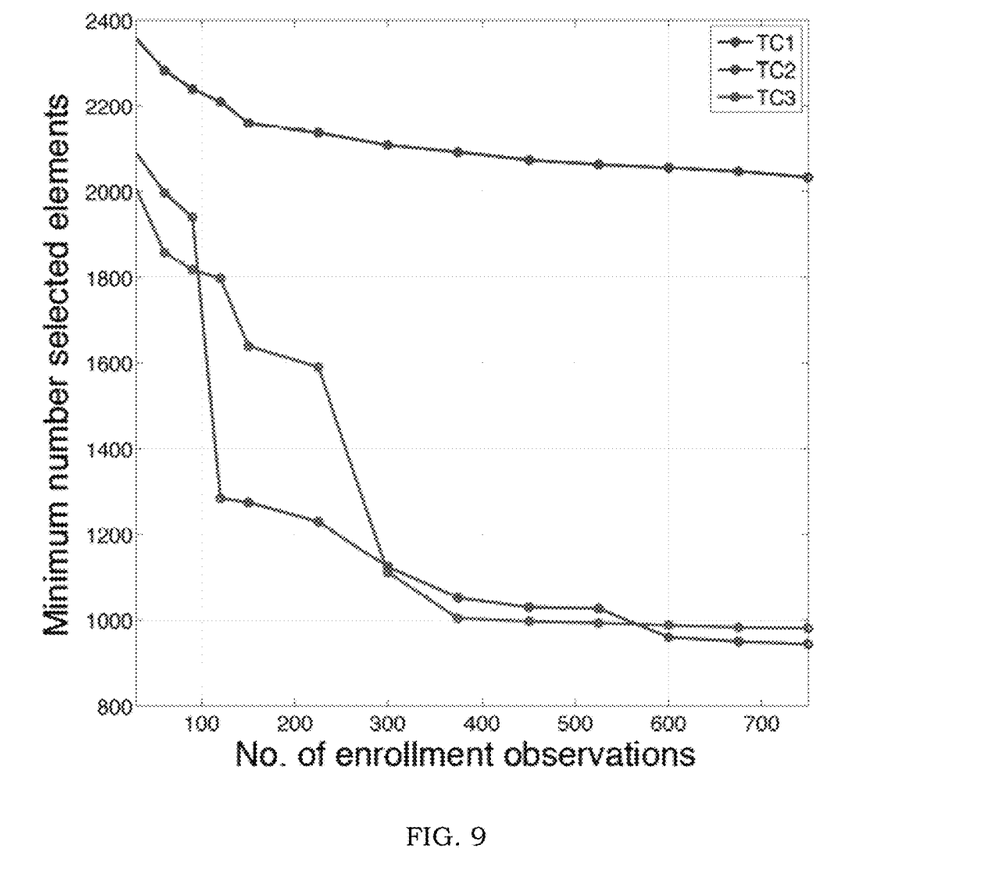
FIG. 9 is a graph showing the number of unanimous elements remaining after a series of enrollment observations.

When using the unanimous selection method, the number of observations conducted must be balanced against the need to have a minimum number of elements in the stable subset. Certainly, an infinite number of observations could produce an error rate of zero, but no scan elements would remain for consideration since the number of elements considered for the stable subset decreases after each power-up cycle, or enrollment observation. FIG. 9 shows the number of elements remaining after each observation for the three different chips observed in FIG. 8. As shown in FIG. 9, even after 750 observations, there are 944 out of 6,057 elements remaining. This subset is sufficiently large to enable use as a PUF. Thus, a user will have the ability to select the stable subset from a wide range of possibilities based on the error rate and subset size.

Given the manufacturing variability inherent in each IC, the stable subset will be unique to each IC. Moreover, the scan elements that form part of the stable subset cannot be predicted—that is, they are random. However, the randomness of the PUF can be further increased by selecting only a fraction of the stable subset determined by the unanimous selection method. For example, a random selection of 100 of the 944 stable elements discussed in FIG. 9 can be used as a unique identifier for the IC. The selection process can vary. For example, in a second IC, 133 elements could be chosen. Moreover, the location of the elements could change from IC to IC.

Figure 5:
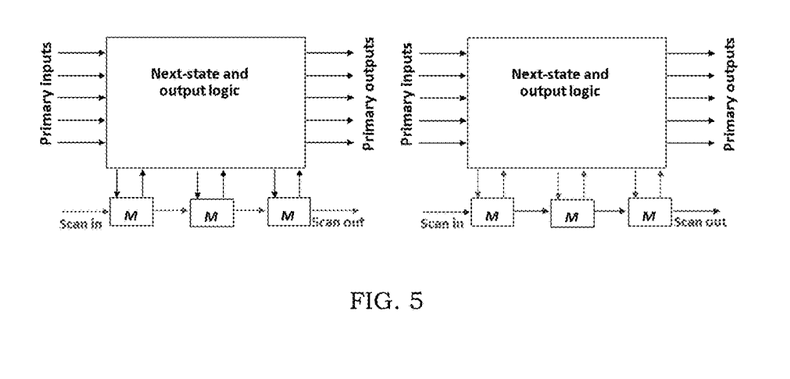
FIG. 5 shows a schematic of a reconfiguration of a general synchronous circuit so that virtually all flip-flops are accessible via a scan chain shift register.

Unlike existing PUF designs, the method and system of the present invention re-use the scan chain for PUF purposes while preserving their original testing functionality. FIG. 5 shows how a general synchronous sequential circuit is reconfigured so that virtually all flip-flops are accessible via a scan chain shift register, with normal operation shown on the right and scan mode shown on the left. When the scan enable signal is active (not shown in FIG. 5), it allows the flip-flop state of all the scan chains to be (i) completely controllable by shifting in any string of binary values through the scan-chain input(s), and (ii) completely observable by simultaneously shifting out the held state through the scan-chain output(s). Having comprehensive access to the flip-flop state makes IC testing and debug much more tractable.

Figure 7A:
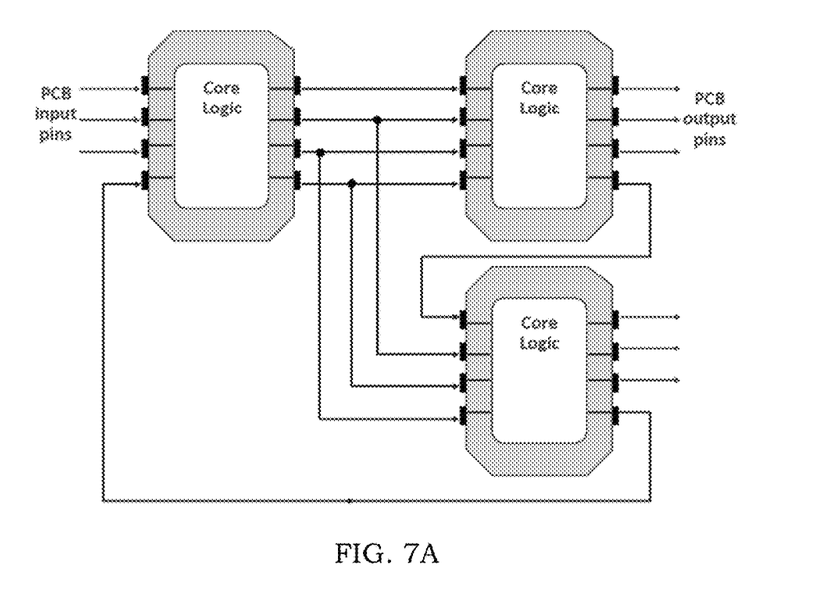
FIGS. 7A-7B show a schematic of a printed circuit board without boundary scan (FIG. 7A) and modified to include boundary scan (FIG. 7B) according to an embodiment of the present invention.
Figure 7B:
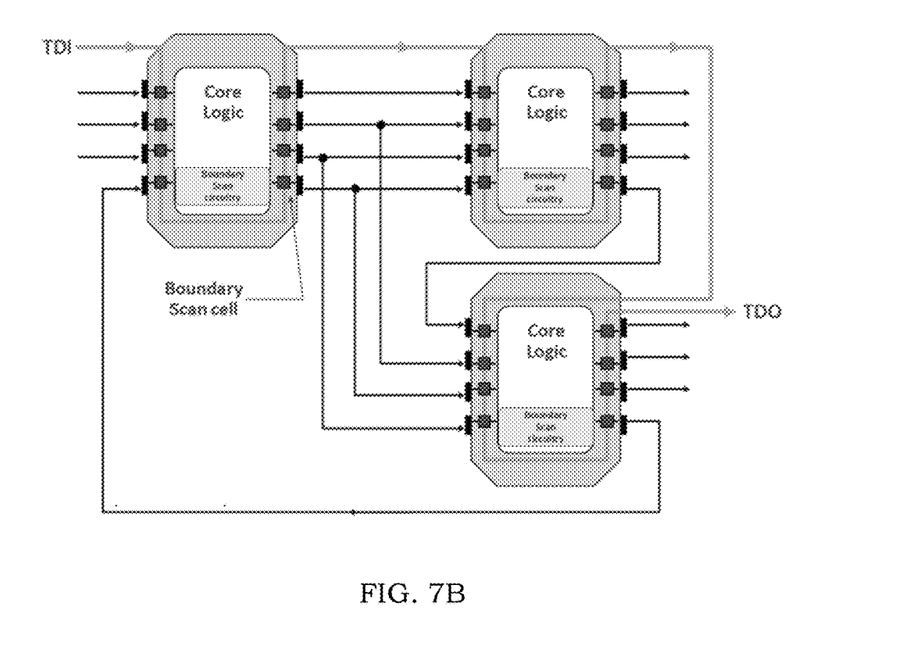

In alternative embodiments, the scan chains of individual chips of a printed circuit board (PCB) are used in a board-wide PUF. Since the major components of a PCB (printed circuit board) consist of ICs with scan, a hierarchical SCAN-PUF can be easily formed using the boundary-scan register that always exists at the board level. Specifically, a board-level SCAN-PUF is simply the combination of its individual IC SCAN-PUFs that are all easily accessible through the board-level boundary scan, or implemented via the boundary scan itself. Finally, since full systems consist of multiple PCBS, then system-level authentication is achieved by accessing and combining the individual board-level SCAN-PUFs, thus creating a freely-accessible, system-level PUF. FIG. 7A shows a PCB without a boundary scan, whereas FIG. 7B shows a PCB with a boundary scan.

In one alternative embodiment, the board level SCAN-PUF is created through the adherence to the IEEE standard 1149.1. Specifically, because the 1149.1 standard allows access to each IC's boundary and internal scan registers, it will also allow seamless access to each IC's individual PUF. The PUFs can then be combined (e.g., concatenated) to form a board-level PUF. Moreover, since a system can be viewed as collection of PCBs, the board-level PUFs can be also combined to form a system-level PUF. With a board-level PUF, the process confirms that the board is authentic and that no chips have been replaced during transport from the manufacturer to the customer.

Internal or boundary scan can be used. The form of scan depicted in FIG. 5 is referred to as internal scan since it involves the flip-flops used during the normal operation of the IC. Boundary scan has been developed to ease printed circuit board (PCB) testing. In boundary scan, a shift register called the 'boundary scan chain' is connected to the signal inputs and outputs of the IC. Daisy chaining the boundary scan registers of each IC on the PCB provides complete (serial) controllability/observability of all chip inputs and outputs for test and debug. Because of its ubiquity, boundary scan was further developed by the Joint Test Action Group (JTAG) and adopted as a standard by the Institute of Electrical and Electronics Engineers (IEEE). Virtually all chip makers have adopted this standard, thus ensuring that PCBs consisting of ICs that contain compliant implementations of the boundary scan standard (IEEE 1149.1) are fully accessible during test.

Figure 6:
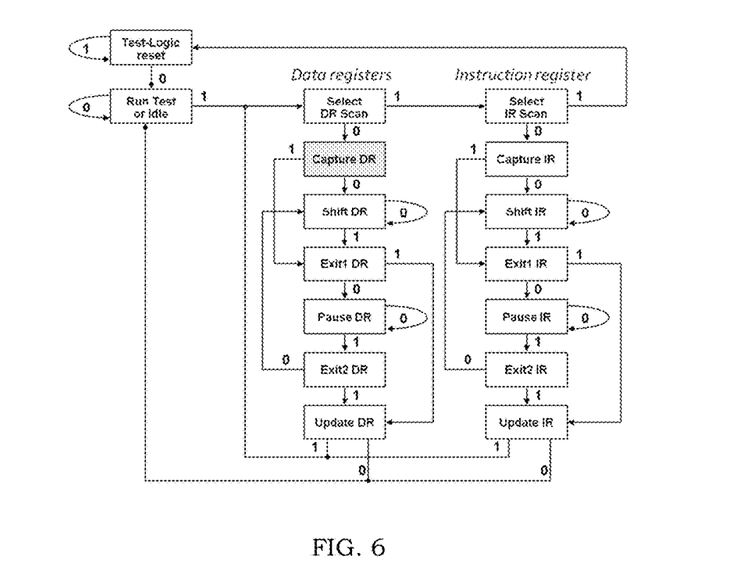
FIG. 6 shows a state diagram of the boundary scan controller.

FIG. 6 shows a board containing several chips altered to include boundary scan. Reading the boundary scan register via the 'Shift DR' requires the transitioning through the 'Capture DR' state. A capture operation updates the power-on state with a likely unpredictable, non-deterministic state. In this embodiment, to prevent a non-deterministic state, a new private instruction is added that disables the capture data register operation.

The boundary-scan standard also specifies a specific 16-state finite-state machine for controlling the boundary scan chain along with some specific architectural features for implementing several mandatory operations, one of which includes shifting-in/shifting-out bit values into/from the boundary-scan register. Another optional, but typically-implemented, operation involves providing access to the internal scan chains under the control of the boundary-scan controller. Thus, at the board level, both the internal and boundary scan chains of each chip are serially accessible.

As previously described, after power-up, flip-flops will initialize themselves to some particular state based on the individual transistor characteristics imposed by the variations in the manufacturing process, where the state is unpredictable but stable. Since the impact of the variations will differ for each IC, it is expected that each IC will have its own unique state.

For a manufacturer determine the stable subset, the IC can be powered up and before any operation is conducted, the uncorrupted power-up state is shifted out of all the scan chains (both internal and boundary). The power-on, shift cycle is repeated several times to determine which flip-flops consistently power-up in the same 1-bit state, where the number of cycles is chosen to ensure a sufficient level of confidence in the power-on state for some subset of the scan-chain flip-flops. During manufacturing testing, the scan chains are shifted thousands of times, so it is anticipated that the extra cost for characterizing a given chip's SCAN-PUF will be minimal.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of using a scan chain in an integrated circuit as a physically unclonable function, the method comprising:
   initiating a power-up of a scan chain in an integrated circuit;
   performing a plurality of power-up cycles;
   observing a power-up state of the scan chain after each power-up cycle by accessing the scan chain via a scan chain shift register,
      wherein the testing functionality of the scan chain is preserved; and
   identifying a stable subset of the scan chain based on the observed power-up state after each power-up cycle,
      wherein the stable subset of the scan chain represents a stable group of scan elements that revert to the same power-up state after substantially each power-up cycle of the plurality of power-up cycles,
      wherein the stable subset is unique to the integrated circuit.

2. The method of claim 1, wherein each scan element of the stable group of scan elements is observed in the same individual power-up state after each power-up cycle of the plurality of power-up cycles.

3. The method of claim 1, wherein each scan element of the stable group of scan elements is observed in the same individual power-up state after a majority of the plurality of power-up cycles.

4. The method of claim 1, further comprising:
   arbitrarily removing a portion of the stable scan elements from the stable subset, thereby increasing the randomness of the stable subset.

5. The method of claim 1, further comprising:
   creating a response to an input challenge using the stable subset.

6. The method of claim 1, further comprising:
   using the stable subset as a unique identifier for the integrated circuit.

7. The method of claim 1, wherein identifying a stable subset further comprises:
   removing a scan element from consideration if it has a power-up state that differs from a previous power-up cycle; and conducting further power-up cycles to determine the stable subset.

8. The method of claim 7, further comprising:
considering an error rate and stable subset size to determine when to cease conducting further power-up cycles.

9. The method of claim 1, further comprising:
storing the stable subset in a database.

10. The method of claim 9, further comprising:
cross-referencing the stable subset for the device to a serial number for the device in the database.

11. The method of claim 10, further comprising:
receiving a communication from a third party, wherein the communication contains a scan chain read-out and the serial number for the device;
identifying the stable subset for the device in the database by using the serial number; and
authenticating the device if the scan chain read-out contains the stable subset identified in the database for the device.

12. An authentication system, comprising:
an integrated circuit having a scan chain, the scan chain comprising a plurality of scan elements;
a scan-out port connected to the scan chain,
wherein a power-up state of the plurality of scan elements are observable on the scan-out port,
wherein the testing functionality of the scan chain is preserved;
circuitry in communication with the scan-out port, wherein the circuitry is adapted to:
read the power-up state from the scan-out port after performing a plurality of power-up cycles, and
identify a stable subset of scan elements based on the read power-up state after each power-up cycle,
wherein the stable subset of scan elements represents a group of scan elements observed in a same power-up state after most power-up cycles,
wherein the stable subset contains a unique identifier of the integrated circuit.

13. The authentication system of claim 12, further comprising:
an enrollment database in communication with the circuitry,
wherein the enrollment database contains information about an integrated circuit and its associated unique identifier.

14. The authentication system of claim 12, wherein the unique identifier cannot be determined from observing the stable subset.

15. The authentication system of claim 12, wherein the unique identifier is based on the stable subset.

16. The authentication system of claim 12, wherein the plurality of scan elements are D-type flip-flops.

* * * * *